United States Patent
Oyasato

(10) Patent No.: US 10,152,348 B2
(45) Date of Patent: Dec. 11, 2018

(54) MANAGING USE A LIMITED-LIFE STORAGE DEVICE BY SUSPENDING CLASSES OF TASK BASED ON AN AMOUNT OF DATA TO BE WRITTEN AND AN EFFICIENCY INDEX

(71) Applicant: KYOCERA Document Solutions Inc., Osaka (JP)

(72) Inventor: Tomoki Oyasato, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 219 days.

(21) Appl. No.: 15/357,108

(22) Filed: Nov. 21, 2016

(65) Prior Publication Data
US 2017/0153912 A1    Jun. 1, 2017

(30) Foreign Application Priority Data

Nov. 26, 2015  (JP) .................................. 2015-230156
Mar. 2, 2016   (JP) .................................. 2016-040539

(51) Int. Cl.
    *G06F 9/48*    (2006.01)
(52) U.S. Cl.
    CPC ................... *G06F 9/4806* (2013.01)
(58) Field of Classification Search
    CPC .................................................. G06F 9/4806
    See application file for complete search history.

(56) References Cited

U.S. PATENT DOCUMENTS

| | | | | |
|---|---|---|---|---|
| 8,918,583 | B2* | 12/2014 | Hoang | ...................... G06F 1/26 324/76.11 |
| 2003/0181216 | A1* | 9/2003 | Tsai | ...................... H04W 88/06 455/517 |
| 2009/0172682 | A1* | 7/2009 | Bobak | ...................... H04L 69/40 718/103 |
| 2010/0235569 | A1* | 9/2010 | Nishimoto | ............... G06F 3/06 711/103 |

FOREIGN PATENT DOCUMENTS

| | | |
|---|---|---|
| JP | 2009-055457 A | 3/2009 |
| JP | 2013-152661 A | 8/2013 |

* cited by examiner

*Primary Examiner* — Eric C Wai
*Assistant Examiner* — Jorge A Chu Joy-Davila
(74) *Attorney, Agent, or Firm* — Studebaker & Brackett PC

(57) ABSTRACT

A job for which execution is requested is classified as one of classes. The amount of data to be written into a non-volatile storage device by execution of the job for which execution is requested is acquired. The efficiency index is calculated for each of the classes based on an execution evaluation value of the class and the amount of data to be written into the non-volatile storage device by execution of at least one job that has been already classified as the class. From among the classes, a class having an efficiency index of no greater than an efficiency threshold value is determined as the execution suspending class. When the job for which execution is requested belongs to the execution suspending class, execution of the job is suspended.

7 Claims, 3 Drawing Sheets

| Class (function) | Job count (n) | Execution evaluation value (N) | Write data amount (d) | Average write data amount (m=d/n) | Efficiency index (e=N/m) |
|---|---|---|---|---|---|
| Print Mono | 500 | 1,000 | 50,000 | 100 | 10 |
| Print Color | 5,000 | 6,000 | 1,000,000 | 200 | 30 |
| Copy | 1,000 | 1,000 | 160,000 | 160 | 6.25 |
| Scan To Box | 500 | 500 | 50,000 | 100 | 5 |
| ... | ... | ... | ... | ... | ... |

FIG. 2

MANAGING USE A LIMITED-LIFE STORAGE DEVICE BY SUSPENDING CLASSES OF TASK BASED ON AN AMOUNT OF DATA TO BE WRITTEN AND AN EFFICIENCY INDEX

INCORPORATION BY REFERENCE

The present application claims priority under 35 U.S.C. § 119 to Japanese Patent Application No. 2015-230156, filed on Nov. 26, 2015 and Japanese Patent Application No. 2016-040539 filed on Mar. 2, 2016. The contents of these applications are incorporated herein by reference in their entirety.

BACKGROUND

The present disclosure relates to a storage medium storing therein a storage device usage management program that utilizes a limited-life non-volatile storage device such as a solid state drive (SSD), and an electronic device including the storage device usage management program.

Hard disk drives (HDDs) have been widely used as non-volatile storage devices in image forming apparatuses and other electronic devices. In recent years, due to technical advancement in a semiconductor field and a cost reduction of semiconductors, some electronic devices use a non-volatile storage device (hereinafter, may be referred to as a semiconductor drive) using a semiconductor such as an SSD or a NAND flush device. The semiconductor drive, which needs shorter reading time than the HDD, is useful. However, many semiconductor drives have a limit on the number of times of writing therein and have a limited life. That is, the semiconductor drives cannot eternally be used, and thus the limit on the number of times of writing therein needs to be taken into consideration in use of the semiconductor drives.

For the reason as above, a certain image forming apparatus calculates the number of times of writing by obtaining the number of processed pages and the number of times of execution of the processing. When the number of times of writing reaches or exceeds a threshold value, the image forming apparatus notifies so.

Another image forming apparatus suspends writing into a limited-life non-volatile storage device when the number of defective blocks in the limited-life non-volatile storage device reaches a specific value.

SUMMARY

A storage medium of the present disclosure is a non-transitory computer readable storage medium storing therein a storage device usage management program to be executed by a computer. The storage device usage management program is a program for managing usage of a non-volatile storage device that is included in an electronic device and on which a limit on the number of times of writing therein is imposed. The storage device usage management program includes first through seventh program codes. The first program code causes the computer to classify, as one of a plurality of classes, a job for which execution is requested. The second program code causes the computer to acquire an amount of data, the data being to be written into the non-volatile storage device by execution of the job for which execution is requested. The third program code causes the computer to calculate an efficiency index for each of the plurality of classes based on an execution evaluation value of each of the plurality of classes and an amount of data to be written by execution of at least one job that has been already classified as each of the plurality of classes. The fourth program code causes the computer to determine from among the plurality of classes, a class having an efficiency index of no greater than an efficiency threshold value as an execution suspending class, or a specific number of classes in ascending order of the efficiency index from a class having a lowest efficiency index each as the execution suspending class. The fifth program code causes the computer to determine whether or not the job for which execution is requested belongs to the execution suspending class. The sixth program code causes the computer to suspend execution of the job for which execution is requested when the job belongs to the execution suspending class, and allow execution of the job for which execution is requested when the job does not belong to the execution suspending class. The seventh program code causes the computer to update the execution evaluation value of a class to which the job for which execution is requested belongs and at least one of a sum and an average value of the amount of data to be written by execution of the at least one job that has been already classified as the class.

An electronic device of the present disclosure includes a processor that executes a storage device usage management program and a non-volatile storage device on which a limit on the number of times of writing therein is imposed. The storage device usage management program is the storage device usage management program described above.

BRIEF DESCRIPTION OF THE DRAWINGS

FIG. 2 illustrates examples of efficiency indices of a respective plurality of classes.

DETAILED DESCRIPTION

Hereinafter, an embodiment of the present disclosure will be described on the assumption that an electronic device is an image forming apparatus.

Figure 1:
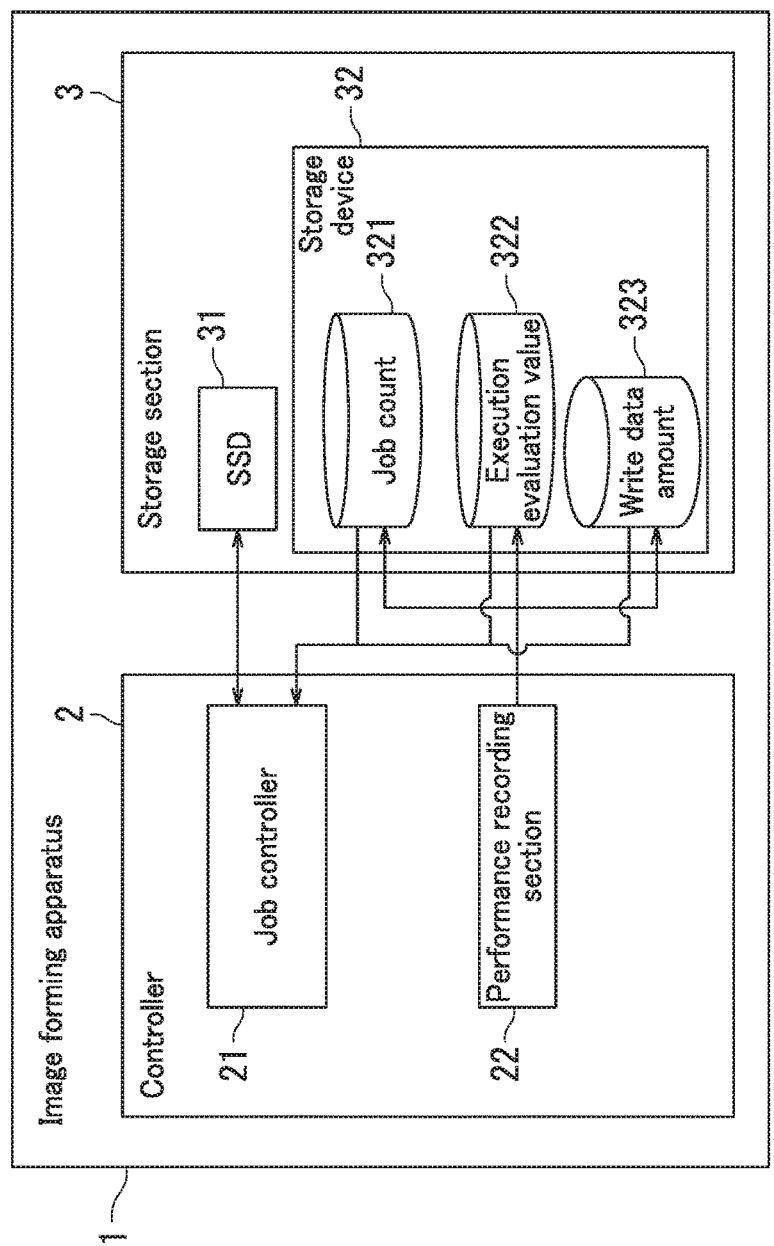
FIG. 1 illustrates configuration of an image forming apparatus.

FIG. 1 is a diagram illustrating configuration of an image forming apparatus 1 (electronic device) of the present disclosure. The image forming apparatus 1 includes a controller 2 and a storage section 3. In the present embodiment, the image forming apparatus 1 has classes (functions) such as Print Mono (monochrome printing), Print Color (color printing), and Copy (copying).

The controller 2 includes a job controller 21 and a performance recording section 22.

The job controller 21 calculates efficiency indices of the respective classes and suspends execution of a job belonging to a class having a low efficiency index. In the present embodiment, the job controller 21 classifies, as one of the plurality of classes, a job for which execution is requested. Specifically, the job controller 21 receives to-be-used function information together with a request for job execution. The to-be-used function information indicates one of the plurality of functions of the image forming apparatus 1 that the job for which execution is requested uses. The job controller 21 classifies, as one of the plurality of classes, the job for which execution is requested, by referring to the received to-be-used function information. For example, in a situation in which a job for which execution is requested uses the copying function, the job is classified as Copy.

The performance recording section 22 updates a job count 321, an execution evaluation value 322, and a write data amount 323 of a class to which a job for which execution is requested belongs. The job count 321, the execution evaluation value 322, and the write data amount 323 are stored in a storage device 32. The job count 321 indicates the number of jobs for which execution has been requested. The write data amount 323 indicates the amount of data to be written into a solid stated drive (SSD) 31 (non-volatile storage device) by job execution.

The controller 2 is a processor such as a central processing unit (CPU) and operates as the job controller 21 and the performance recording section 22 through program execution. Programs for the job controller 21 and the performance recording section 22 constitute a storage device usage management program for use of electronic devices.

The storage section 3 includes the SSD 31 and the storage device (for example, hard disk drive (HDD)) 32. The SSD 31 has a limit on the number of times of writing therein and the HDD 32 does not have a limit on the number of times of writing therein. The SSD 31 is an example of a non-volatile storage device on which a limit on the number of times of writing therein is imposed.

The SSD 31 is one of widely used SSDs and has a limit on the number of times of writing therein. The SSD 31 has a plurality of physical blocks. The number of times of writing into each block is equalized among the plurality of blocks. The equalization is implemented by a function of the SSD 31. Once the number of times of writing into one of the blocks reaches an upper limit, writing into the block is suspended and the block turns to a defective block. That is, the life of the SSD 31 depends on the amount of data written into the SSD 31. In the above configuration, it is possible to roughly estimate timing with which a block will be defective and the number of defective blocks by adding up the amount of data written into the SSD 31. Further, the SSD 31 has a so-called Self-Monitoring, Analysis and Reporting Technology (S.M.A.R.T.) function for notifying the number of defective blocks.

The SSD 31 is considered to run out when a ratio of defective blocks relative to all blocks in the SSD 31 reaches a specific value (for example, 10%). As described above, the number of times of writing into each block is equalized among the plurality of blocks. Therefore, it can be said that the SSD 31 runs out when a ratio of the number of times of writing into the SSD 31 (specifically, a sum of numbers of times of writing into the respective blocks in the SSD 31) relative to the necessary number of times of writing all the blocks in the SSD 31 each turn to a defective block by writing reaches a specific value (for example, 10%).

As described above, the job count 321, the execution evaluation value 322, and the write data amount 323 are stored in the storage device 32. However, the job count 321 and the execution evaluation value 322 are the same (or proportional to each other) in some cases as described later. In such a case, either of the job count 321 and the execution evaluation value 322 may be stored in the storage device 32.

Figure 3:
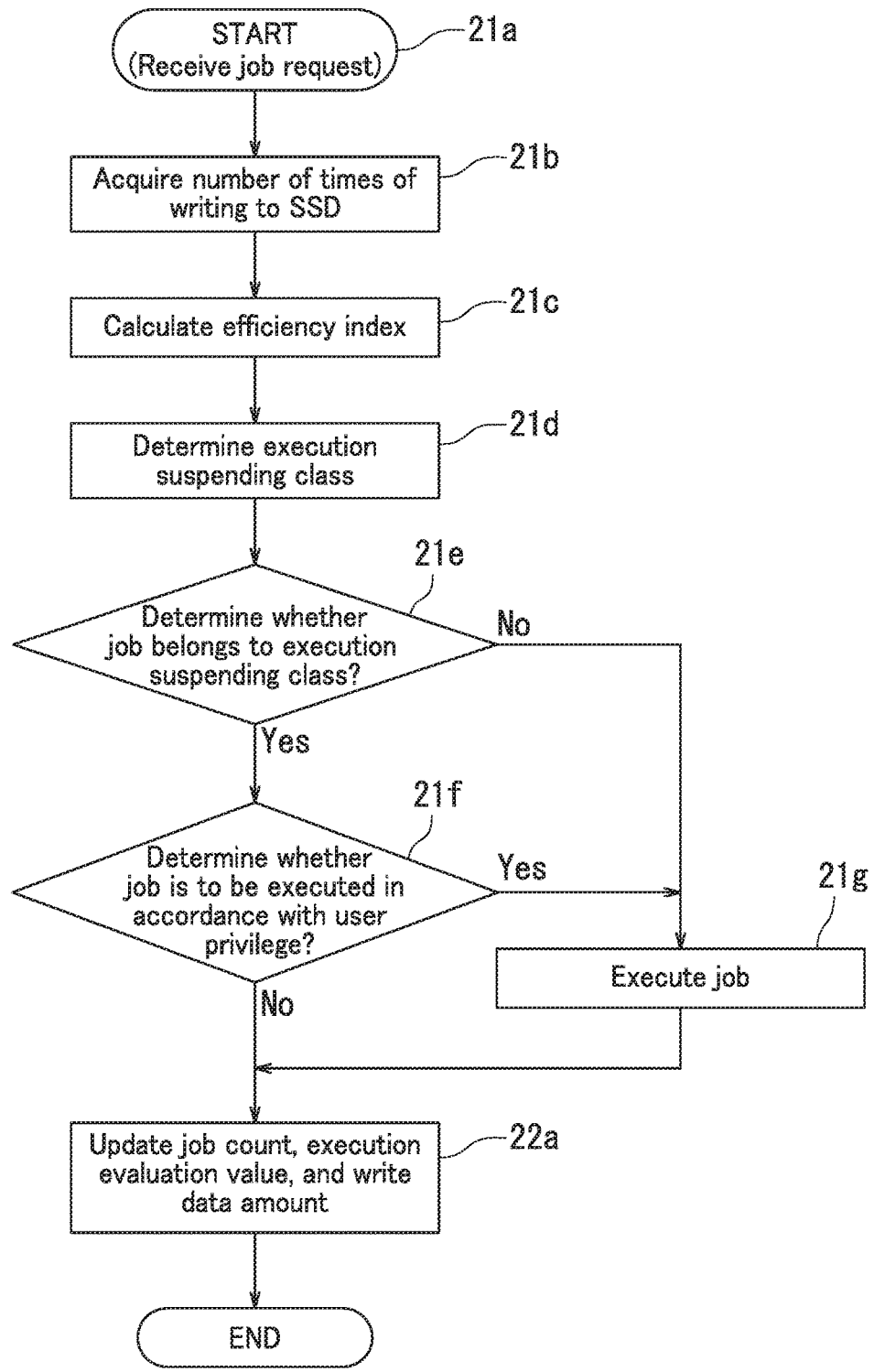
FIG. 3 illustrates processing of a storage device usage management program.

The following explains procedures for suspending job execution with reference to FIGS. 2 and 3.

FIG. 2 lists examples of efficiency indices of the respective classes. As listed in FIG. 2, an efficiency index e is determined for each of the classes.

The performance recording section 22 performs counting addition of a job count n (321), an execution evaluation value N (322), and a write data amount d (323) on a class by class basis and stores results of counting into the storage device 32. The performance recording section 22 increments the job count n (321) by 1 each time job execution is requested. The performance recording section 22 increments the execution evaluation value N (322) by 1 each time job execution is requested. The performance recording section 22 further increments the execution evaluation value N (322) by a value that represents importance of a user who instructs job execution. The performance recording section 22 increments the write data amount d (323) by an amount of data (in units of megabytes, for example) written into the SSD 31 by job execution, or by an amount of data estimated to be written into the SSD 31 by job execution. In the following description, processing performed by the performance recording section 22 to increment the execution evaluation value N (322) by a value that represents importance of a user who instructs job execution may be referred to as "importance adjustment processing".

A value that represents importance of a user who instructs job execution is assigned on a user by user basis beforehand. A user who instructs job execution can be identified according to a user ID or the like.

Importance of a user is determined for example by any one of the following procedures: a procedure of holding and using data that indicates correspondences between users and their importance; a procedure of giving each user a user name based on a specific rule and determining importance of a user according to the user name; and a procedure of determining importance of a user according to an ID of a terminal (by inferring the user) through which job execution is instructed. The importance of a user may be determined by any procedure other than those described above.

For example, importance of a general user may be represented by "1", importance of a user at a higher position in a company may be represented by "2", and importance of a user engaged in an important and urgent project may be represented by "3". Importance of a specific user may be increased to prevent job execution instructed by the user from being suspended.

The same importance may be assigned to all the users. In this case, the job count n (321) and the execution evaluation value N (322) are the same (or proportional to each other). In a configuration in which the job count n (321) and the execution evaluation value N (322) are the same, it is only required that the performance recording section 22 stores only either of the job count n (321) and the execution evaluation value N (322) into the storage device 32.

An average write data amount m indicates an average value of the amount of data to be written into the SSD 31 by execution of jobs classified as each of the classes. That is, the average write data amount m is an amount of data to be written per job and is calculated based on the write data mount d (323) and the job count n (321) using an equation m=d/n. The performance recording section 22 may store the average write data amount m (as the write data amount d (323)) into the storage device 32 in place of the write data amount d (323).

The efficiency index e is calculated based on the job count n (321), the execution evaluation value N (322), and the write data amount d (322) using an equation e=f(n,N,d). In the present embodiment, the following equation is established: e=f(n,N,d)=N/m=N/(d/n)=nN/d. The function f can be optionally designed. For example, the following equation may be established: e=f'(N,m)=N/m. However, the smaller the average write data mount m is, the higher the efficiency index e should be. Also, the larger the execution evaluation value N (322) is, the higher the efficiency index e should be.

That is, the efficiency index e should be represented as a decreasing function of the average write data amount m and an increasing function of the execution evaluation value N (322). Therefore, it may be preferable to satisfy $\partial f'/\partial N>0$ and $\partial f'/\partial m<0$ in a situation in which f(n,N,d) can be converted into f'(N,m) (i.e., the function f can be converted into the function f' with variables N and m and without n by substituting d by nm).

FIG. 3 illustrates processing of the storage device usage management program. Once job execution is requested (Step 21a), the job controller 21 is activated.

The job controller 21 initially monitors and acquires the number of times of writing into the SSD 31 (Step 21b). Specifically, the job controller 21 acquires S.M.A.R.T. information from the SSD 31.

Next, the job controller 21 calculates the efficiency index e for each of the classes (Step 21c). Specifically, the job controller 21 reads the execution evaluation value N (322) and the write data amount d (323) from the storage device 32 and calculates the efficiency index e using the equation e=f(n,N,d). The order of Step 21b and Step 21c is optional and may be reversed.

Next, the job controller 21 determines an execution suspending class (Step 21d). Execution of a job belonging to a class that is determined as an execution suspending class will be suspended (i.e., the job will not be executed).

In the present embodiment, the job controller 21 determines from among the plurality of classes, a class having an efficiency index e of no greater than an efficiency threshold value as an execution suspending class. Alternatively, the job controller 21 determines from among the plurality of classes, a specific number of class or classes in ascending order of the efficiency index e from a class having the lowest efficiency index e, each as an execution suspending class. Specifically, the job controller 21 determines n (n=1, 2, 3, . . . ) class(es) in ascending order of the efficiency index e from a class having the lowest efficiency index e, each as an execution suspending class. For example, in a situation in which the number of times of writing into the SSD 31 is greater than a writing threshold value, the job controller 21 determines a class having the lowest efficiency index e as an execution suspending class (n=1). The writing threshold value may be set for each case where n=2, 3, . . . . Alternatively, the writing threshold value may be set to be the number of times of writing that corresponds to a specific ratio (for example, 90%) relative to the number of times of writing the SSD 31 runs out by writing. In this case, the SSD 31 runs out when writing into the SSD 31 is further performed the times the number of which corresponds to a difference between the number of times of writing the SSD 31 runs out by writing and the writing threshold value. According to the embodiment of the present disclosure, the SSD 31 can be effectively used by selectively suspending writing into the SSD 31 from when the number of times of writing into the SSD 31 reaches the writing threshold value until the SSD 31 runs out.

An efficiency threshold value may be set in the job controller 21 for the efficiency index e, rather than determining a class (n class(es)) as an execution suspending class in ascending order of the efficiency index e from a class having the lowest efficiency index e. In this case, the job controller 21 can determine a class having an efficiency index e of no greater than the efficiency threshold value as an execution suspending class.

In the example illustrated in FIG. 2, the efficiency indices e of the respective classes are high in order of Print Color, Print Mono, Copy, and Scan To Box. It is thought that execution of a job belonging to one or more classes is suspended in ascending order of the efficiency index e as the number of times of writing into the SSD 31 increases. For example, on the assumption that execution of a job belonging to respective two classes (n=2) having the lowest efficiency index e and the second lowest efficiency index e is suspended in the example of FIG. 2, the job controller 21 determines Scan To Box and Copy as execution suspending classes.

Alternatively, the job controller 21 may determine a class having an efficiency index e of less than the efficiency threshold value as an execution suspending class. In this case, execution of a job belonging to a class having an efficiency index e of less than the efficiency threshold value is suspended. For example, in a configuration in which the efficiency threshold value is 15, the job controller 21 determines Scan To Box, Copy, and Print Mono as execution suspending classes.

In the example illustrated in FIG. 2, the job counts n are different from the respective execution evaluation values N. This means that the above-described importance adjustment processing has been performed. If the importance adjustment processing is not performed (for example, if all the users have the same importance), the execution evaluation values N are the same as the respective job counts n. In the example illustrated in FIG. 2, when the efficiency indices e are calculated using e=n/m rather than e=N/m provided that N=n, the efficiency index e of Print Mono is 5. As a consequence, the efficiency index e of Print Mono is smaller than that of Copy. In a case where execution of a job belonging to respective two classes having the lowest efficiency index e and the second lowest efficiency index e is to be suspended, Scan To Box and Print Mono are determined as execution suspending classes. Thus, the execution suspending classes differ between a case where the importance adjustment processing has been performed and a case where the importance adjustment processing has not been performed.

In a configuration in which the importance adjustment processing is performed in the example illustrated in FIG. 2, the execution evaluation value N is large compared with the job count n in Print Mono (when compared to the other classes). This is because Print Mono has been frequently used by a user of great importance. Thus, execution of the importance adjustment processing reduces a possibility that execution of a job belonging to a class that is frequently used by a user whose importance is represented by a large value (i.e., a class that is important for business) is suspended.

The processing from Step 21b to Step 21d may not be performed every time job execution is requested. In a configuration in which the processing from Step 21b to Step 21d is not performed every time job execution is requested, the performance recording section 22 may store an execution suspending class determined in Step 21d for example into the storage device 32 to apply the stored execution suspending class to a subsequent job. This is because no significant problem arises even where execution suspending classes are fixed for a certain period that is necessary to cause a change in the execution suspending classes (for example, during ten-time job execution), since variation in the number of times of writing into the SSD 31 and the efficiency index e upon one time job execution can be predicted.

Next, the job controller 21 determines whether or not a job for which execution is requested belongs to an execution suspending class (Step 21e). When the job controller 21 determines that the job for which execution is requested does not belong to an execution suspending class (No in Step 21e), the job controller 21 causes the image forming apparatus 1 to execute the job (allow the job to be executed) (Step 21g).

When the job controller 21 determines that the job for which execution is requested belongs to an execution suspending class (Yes in Step 21e), the job controller 21 determines whether or not the job is to be executed based on user privilege (Step 21f). When the job controller 21 determines that the job is to be executed based on user privilege (Yes in Step 21f), the job controller 21 allows the job to be executed, for example. Alternatively, the job controller 21 increases the efficiency index e (for example, multiplies the efficiency index e by a value that represents importance of the user) and performs recalculation to determine whether or not the class to which the job belongs is an execution suspending class (whether or not execution of the job is to be suspended). Any other processing may be adopted for job execution based on the user privilege. When the job controller 21 determines that execution of the job is not based on the user privilege (No in Step 21f), the job will not be executed. Determination of whether or not job execution is based on the user privilege (Step 21f) may not be necessarily performed. This is because determination of whether or not job execution is based on the user privilege (Step 21f) is performed for determining whether or not job execution is exceptionally allowed for emergency processing or the like, and such determination may be unnecessary in some operating situations.

Thereafter, the performance recording section 22 updates the job count 321, the execution evaluation value 322, and the write data amount 323 (Step 22a), whereby the processing of the storage device usage management program ends.

In the specific example illustrated in FIG. 3, the performance recording section 22 updates the job count 321, the execution evaluation value 322, and the write data amount 323 (Step 22a) even when a job is not executed. This is because a job for which execution is requested and that is not executed may be demanded. It is noted that an exact write data amount may not be obtained without actual job execution. In a configuration as above, the performance recording section 22 may estimate the write data amount, hold the average write data amount without updating, or adopt any other processing scheme.

As explained above in detail, in the image forming apparatus 1 of the embodiment, the storage device usage management program determines a job to be executed based on the efficiency index e. As a result, a job that uses the non-volatile storage device (SSD 31) at high efficiency is preferentially executed to enable efficient use of the non-volatile storage device (SSD 31).

According to the embodiment of the present disclosure, the image forming apparatus 1 can control (suspend or allow) execution of a job according to a class to which the job belongs. Further, the image forming apparatus 1 can determine whether or not job execution should be suspended according to the efficiency index e.

According to the embodiment of the present disclosure, the image forming apparatus 1 can determine the efficiency index e according to the job count n (321). The image forming apparatus 1 can perform control so as to increase a possibility that execution of a job belonging to a frequently executed class (having large demand) is not suspended.

According to the embodiment of the present disclosure, the execution evaluation value N (322) of a class to which a job for which execution is requested by a user of great importance belongs is larger than that of a class to which a job for which execution is requested by a user of less importance belongs. In the above configuration, it is possible to reduce a possibility that execution of a job belonging to a class for which execution is frequently requested by a user of great importance is suspended.

According to the embodiment of the present disclosure, the smaller the average write data amount m is, the higher the efficiency index e is. As such, a job that gives less load on the non-volatile storage device (SSD 31) is preferentially executed. Further, the larger the execution evaluation value N (322) is, the higher the efficiency index e is. As such, a frequently executed job (having large demand) is preferentially executed.

According to the embodiment of the present disclosure, the image forming apparatus 1 can obtain the efficiency index e by simple calculation.

According to the embodiment of the present disclosure, the image forming apparatus 1 can determine the execution suspending class based on the number of times of writing into the SSD 31. In the above configuration, the image forming apparatus 1 can effectively use the non-volatile storage device (SSD 31) by appropriately changing the function (class) to which a job execution of which is suspended belongs according to a possible number of times of writing into the non-volatile storage device (SSD 31).

According to the embodiment of the present disclosure, the image forming apparatus 1 can easily classify a job as any of color printing, monochrome printing, and the other classes.

What is claimed is:

1. A non-transitory computer readable storage medium storing therein a storage device usage management program to be executed by a computer,
the storage device usage management program being a program for managing usage of a limited-life non-volatile storage device that is included in an electronic device and on which a limit on the number of times of writing therein is imposed, wherein the storage device usage management program comprises:
a first program code that causes the computer to classify, as one of a plurality of classes, a job for which execution is requested by a user, wherein a request for job execution includes to-be-used function information;
a second program code that causes the computer to acquire an amount of data to be written into the non-volatile storage device by execution of the job for which execution is requested from the to-be-used function information;
a third program code that causes the computer to calculate an efficiency index for each of the plurality of classes based on an execution evaluation value of each of the plurality of classes and the amount of data to be written by execution of the at least one job that has been already classified as belonging to a class of the plurality of classes;
a fourth program code that causes the computer to determine from among the plurality of classes, a class having an efficiency index of no greater than an efficiency threshold value as an execution suspending class, or a specific number of classes in ascending order of the efficiency index, a class having a lowest efficiency index as the execution suspending class;
a fifth program code that causes the computer to determine whether or not the job for which execution is requested belongs to the execution suspending class;

a sixth program code that upon determining that the job belongs to the execution suspending class:
   allows execution of the job for which execution is requested, if determined that the job is to be executed based on user privilege; otherwise
   suspend execution of the job for which execution is requested, and
a seventh program code that causes the computer to allow execution of the job for which execution is requested when the job does not belong to the execution suspending class; and
an eighth program code that causes the computer to update the execution evaluation value of a class to which the executed job belongs and at least one of a sum and an average value of the amount of data written by execution of the at least one job.

2. The non-transitory computer readable storage medium according to claim 1, wherein
   the execution evaluation value of each of the plurality of classes indicates the number of jobs that have been already classified as each of the plurality of classes.

3. The non-transitory computer readable storage medium according to claim 1, wherein
   the execution evaluation value of each of the plurality of classes indicates a value obtained by adding the number of jobs that have been already classified as each of the plurality of classes to a sum of values each representing importance of a user who requested execution of each of the jobs.

4. The non-transitory computer readable storage medium according to claim 1, wherein
   the efficiency index is a decreasing function of an average write data amount and an increasing function of the execution evaluation value, and
   the average write data amount in each of the plurality of classes indicates an average value of the amount of data to be written into the non-volatile storage device by execution of the at least one job that has been already classified as each of the plurality of classes.

5. The non-transitory computer readable storage medium according to claim 4, wherein
   the efficiency index is a value obtained by dividing the execution evaluation value by the average write data amount.

6. The non-transitory computer readable storage medium according to claim 1, wherein
   the fourth program code further causes the computer to monitor the number of times of writing into the non-volatile storage device and change the efficiency threshold value or the specific number of classes each determined as the execution suspending class, based on the monitored number of times of writing.

7. An electronic device, comprising:
a processor that executes a storage device usage management program for the electronic device; and
a non-volatile storage device on which a limit on the number of times of writing therein is imposed, wherein
the storage device usage management program is the storage device usage management program according to claim 1.

* * * * *